(12) United States Patent
Herz et al.

(10) Patent No.: US 7,567,867 B2
(45) Date of Patent: Jul. 28, 2009

(54) METHOD AND DEVICE FOR DIAGNOSING A CRANKCASE VENTILATION OF AN INTERNAL COMBUSTION ENGINE

(75) Inventors: Klaus Herz, Flein (DE); Ingo Fecht, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 12/069,611

(22) Filed: Feb. 11, 2008

(65) Prior Publication Data
US 2008/0201062 A1    Aug. 21, 2008

(30) Foreign Application Priority Data
Feb. 13, 2007   (DE)   ........................ 10 2007 006 938

(51) Int. Cl.
  *F02M 25/06* (2006.01)
  *F02D 45/00* (2006.01)
  *G06F 19/00* (2006.01)
(52) U.S. Cl. .................. 701/114; 123/572; 701/103
(58) Field of Classification Search ................. 701/114, 701/102, 103, 115; 123/572–574
  See application file for complete search history.

(56) References Cited

U.S. PATENT DOCUMENTS

| | | | | |
|---|---|---|---|---|
| 4,603,673 A | * | 8/1986 | Hiraoka et al. ............... | 123/572 |
| 4,790,287 A | * | 12/1988 | Sakurai et al. ............... | 123/573 |
| 4,953,525 A | * | 9/1990 | Sakurai et al. ............ | 123/41.28 |
| 6,279,554 B1 | * | 8/2001 | Sayama et al. ............... | 123/572 |
| 6,880,506 B2 | * | 4/2005 | Gschwindt et al. ...... | 123/195 C |

* cited by examiner

*Primary Examiner*—Hieu T Vo
(74) *Attorney, Agent, or Firm*—Kenyon & Kenyon LLP

(57) ABSTRACT

A method and device for diagnosing a crankcase ventilation of an internal combustion engine, which enable a diagnosis of a malfunction of an actuator of the crankcase ventilation. The internal combustion engine has at least two cylinder banks to which the crankcase ventilation is supplied, and an actuator is provided via whose position the distribution of the crankcase ventilation to the at least two cylinder banks is influenced. In a first position of the actuator, a different distribution of the crankcase ventilation to the at least two cylinder banks comes about than in a second position of the actuator that differs therefrom. Given simultaneously activated operation of the at least two cylinder banks, the actuator is switched over at least one between the two different positions. For at least one of the at least two cylinder banks, a characteristic variable of the internal combustion engine influenced by the crankcase ventilation is determined prior to and following the switchover operation. A minimum value for a change in the characteristic variable of at least one of the at least two cylinder banks and/or the ratio of the characteristic variable between the at least two cylinder banks is specified for the switchover-related change in the distribution of the crankcase ventilation to the at least two cylinder banks. A malfunction of the actuator is detected if at least one change derived from the ascertained values for the characteristic variable undershoots its assigned expected minimum value in quantitative terms.

8 Claims, 3 Drawing Sheets

METHOD AND DEVICE FOR DIAGNOSING A CRANKCASE VENTILATION OF AN INTERNAL COMBUSTION ENGINE

FIELD OF THE INVENTION

The present invention is based on a method and a device for diagnosing a crankcase ventilation of an internal combustion engine.

BACKGROUND INFORMATION

In what is generally known as half-engine operation of an internal combustion engine, half of the cylinders are deactivated by switching off the intake and discharge valves as well as the injection, which allows fuel to be saved in comparison with standard full-engine operation. As an alternative, the half-engine operation also may be realized by deactivating only the injections. However, it must be taken into account then that this causes fresh air to be pumped through the affected cylinders, so that a post-connected catalytic converter is no longer able to convert at an air/fuel ratio of $\lambda=1$. For this reason, half-engine operation realized by deactivating the injection for half of the cylinders is implemented only in a configuration where all cylinders of one cylinder bank to which a separate exhaust tract with its own catalytic converter is assigned are suppressed. The other cylinder bank is always fired in full.

The crankcase ventilation is usually implemented symmetrically on both cylinder banks. In half-engine operation, however, the crankcase ventilation must no longer take place on the suppressed cylinder bank since the catalytic converter assigned to the suppressed cylinder bank is no longer able to convert the oil and gas mist introduced by the crankcase ventilation, which could lead to an exceeding of the prescribed emission limits. Therefore, an actuator in the form of a shutoff valve is used, which is open in full-engine operation and usually enables a symmetrical feeding of the crankcase ventilation to the two cylinder banks. In half-engine operation, this shut-off valve is closed in order to route the crankcase ventilation only to the not suppressed, completely fired cylinder bank. Depending on the position of the shutoff valve, a different distribution of the crankcase ventilation to the two cylinder banks comes about.

Since the exhaust-gas composition in the two exhaust tracts of the cylinder banks is affected to different degrees depending on the position of the shutoff valve, it is desirable to diagnose the function of the shutoff valve.

SUMMARY OF THE INVENTION

In contrast, the method according to the present invention and the device according to the present invention for diagnosing a crankcase ventilation of an internal combustion engine, having the features described herein, have the advantage that, with simultaneously activated operation of the at least two cylinder banks, the actuator is at least once switched over between a first position and a second position, which is different therefrom; a characteristic variable of the internal combustion engine influenced by the crankcase ventilation is determined for at least one of the at least two cylinder banks prior to and following the switchover; a minimum value for a change in the characteristic variable of at least one of the at least two cylinder banks and/or the ratio of the characteristic value between the at least two cylinder banks is specified for the switchover-related change in the distribution of the crankcase ventilation to the at least two cylinder banks; and a malfunction of the actuator is detected if at least one change derived from the ascertained values for the characteristic variable undershoots its assigned expected minimum value in quantitative terms. This makes it possible to determine the function or malfunction of the actuator of the crankcase ventilation in a simple, reliable and economical manner using existing exhaust sensor systems, that is to say, without additional sensors.

The measures set forth and described herein allow for advantageous further developments and improvements of the basic exemplary method described herein.

It is especially advantageous if an oxygen content in the exhaust gas is selected as characteristic variable. Due to the Lambda sensors or probes installed in the exhaust tracts, this variable is available anyway so that no additional sensor-related expenditure is necessary.

Another advantage results if the diagnosis is implemented in an operating state of the internal combustion engine having a constant engine speed and engine loading, in particular in an idling operating state of the internal combustion engine. This achieves a stable operating point of the internal combustion engine and minimizes the influencing of the characteristic variable, in particular the exhaust-gas composition or the oxygen content in the exhaust gas or the Lambda value, by interference variables. In addition, a sufficient signal-to-noise ratio may be assumed in such a stable operating point of the internal combustion engine, since the ratio of air mass flow to crankcase ventilation is typically most favorable in the combustion chamber of the cylinders, i.e., the crankcase ventilation in relation to the air mass flow is greatest.

Another advantage results if a tank ventilation and exhaust diagnoses are deactivated during implementation of the diagnosis of the crankcase ventilation. In this way the tank ventilation or other exhaust diagnoses do not interfere with or falsify the diagnosis of the crankcase ventilation.

Moreover, it is advantageous if the evaluation of the characteristic variable is blocked for a specified debouncing time following a switchover of the actuator's position. This increases the reliability of the diagnosis.

In addition, it is advantageous if, after implementing a number of switchover operations of the actuator that is greater than or equal to a minimum number greater than one, the malfunction of the actuator is diagnosed only if the malfunction is detected more frequently than a specified threshold value. This, too, increases the reliability of the diagnosis and allows the suppression of brief interference effects on the diagnosis.

An exemplary embodiment of the present invention is represented in the drawings and explained in greater detail in the following description.

DETAILED DESCRIPTION

Figure 1:
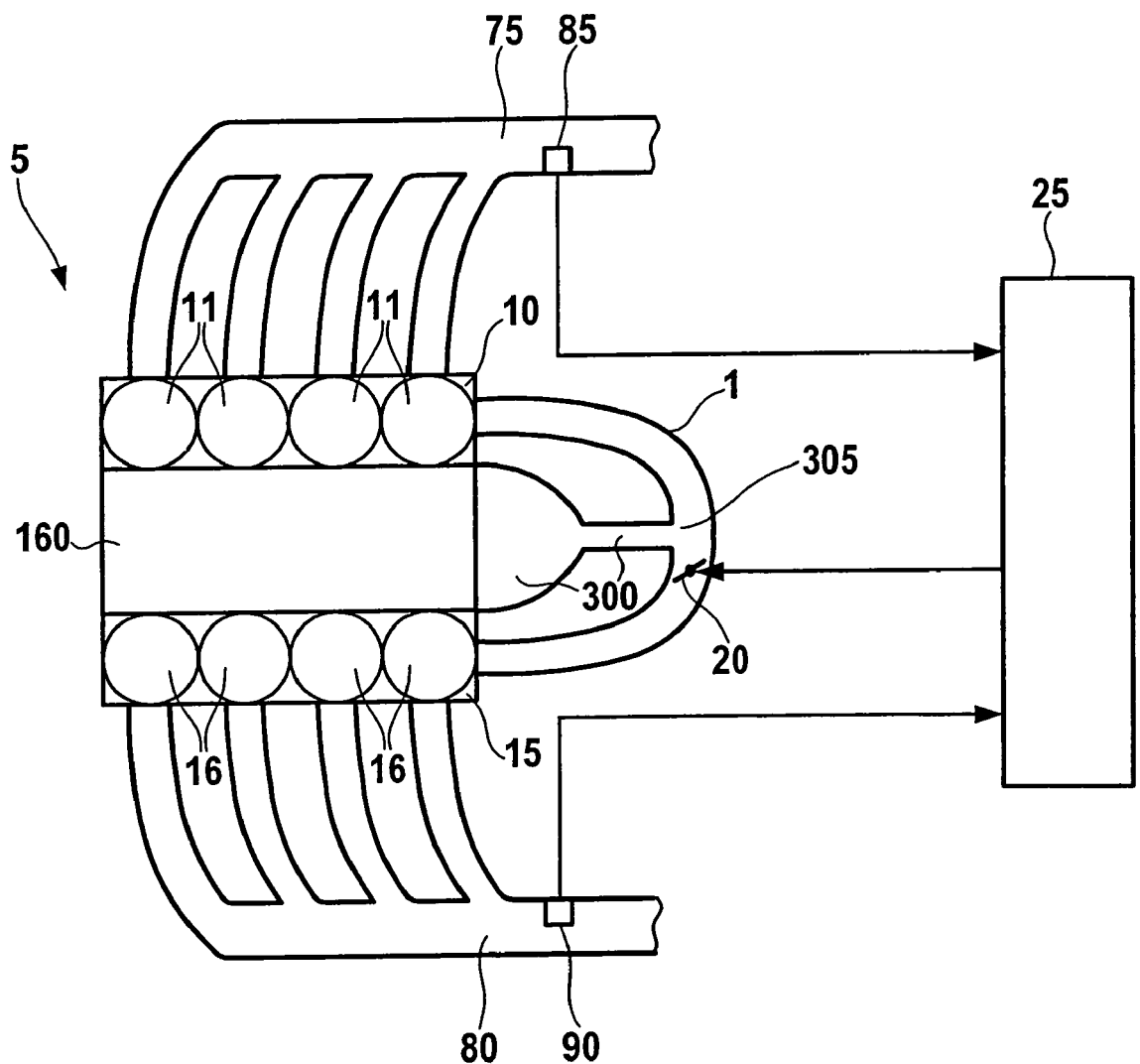
FIG. 1 shows a block diagram of an internal combustion engine.

In FIG. 1, 5 denotes an internal combustion engine having two cylinder banks 10, 15 each having its own fresh air supply; first cylinder bank 10 includes four cylinders 11, and second cylinder bank includes four cylinders 16. The two cylinder banks 10, 15 are interconnected by a crankcase 160, which provides a crankcase ventilation 1 into the two cylinder banks 10, 15. Cylinders 11 of first cylinder bank 10 are connected to a first exhaust tract 75, and cylinders 16 of second cylinder bank 15 are connected to a second exhaust tract 80. A first Lambda sensor 85 is disposed in first exhaust tract 75, and a second Lambda sensor 90 is disposed in second exhaust tract 80. The two Lambda sensors 85, 90 measure the oxygen content of the exhaust gas of the respective exhaust tract 75, 80 and forward the measuring result to a device 25. In the following, it should be assumed by way of example that Lambda sensors 85, 90 supply a signal that is continuous chronologically and in its value. Device 25 also controls an actuator 20 of crankcase ventilation 1. This actuator 20 is used to influence the distribution of the crankcase ventilation into the individual fresh-air supply of the two cylinder banks 10, 15. In the closed state of actuator 20, the crankcase ventilation is completely routed to first cylinder bank 10, and in the open state of actuator 20, the crankcase ventilation is distributed essentially symmetrically to both cylinder banks 10, 15.

According to the exemplary embodiments and/or exemplary methods of the present invention, actuator 20 is switched over at least once between its closed position and its open position with simultaneously activated operation of both cylinder banks 10, 15, i.e., in full-engine operation; and a characteristic variable of the internal combustion engine, e.g., the Lambda value, is determined for at least one of the two cylinder banks 10, 15 prior to and following the switchover operation; a minimum value for a change in the characteristic variable of at least one of the two cylinder banks 10, 15, and/or a minimum value for a change in the ratio of the characteristic variable between the two cylinder banks 10, 15, is specified for the switchover-related change in the distribution of crankcase ventilation 1 to the two cylinder banks 10, 15; and a malfunction of actuator 20 is detected if at least one change derived from the determined values for the characteristic variable undershoots its assigned expected minimum value in quantitative terms. Because of the crankcase ventilation, oil and gas from the crankcase is routed into the combustion chambers of cylinders 11, 16 and also combusted in the combustion chambers. This additional fuel quantity from crankcase ventilation 1 must be deducted from the quantity supplied via the injection, which is implemented in a manner known to one skilled in the art via a Lambda control, which is not shown in the figures for reasons of clarity.

If the actuator is closed in full-engine operation, then first cylinder bank 10 receives twice the amount of oil and gas from crankcase ventilation 1, and second cylinder bank 15 no longer receives any oil and gas from the crankcase ventilation. As a result, the exhaust gas of first cylinder bank 10 becomes richer without a control intervention, and the gas of second cylinder bank 15 becomes leaner.

The corresponding jumps of the affected Lambda signal are monitored with the aid of Lambda sensors 85, 90 and evaluated with regard to the function of actuator 20. If actuator 20 is opened again following an applicable waiting time, then a jump of the Lambda value in the respective other direction takes place, which in turn is monitored by individual Lambda sensor 85, 90.

Figure 2:
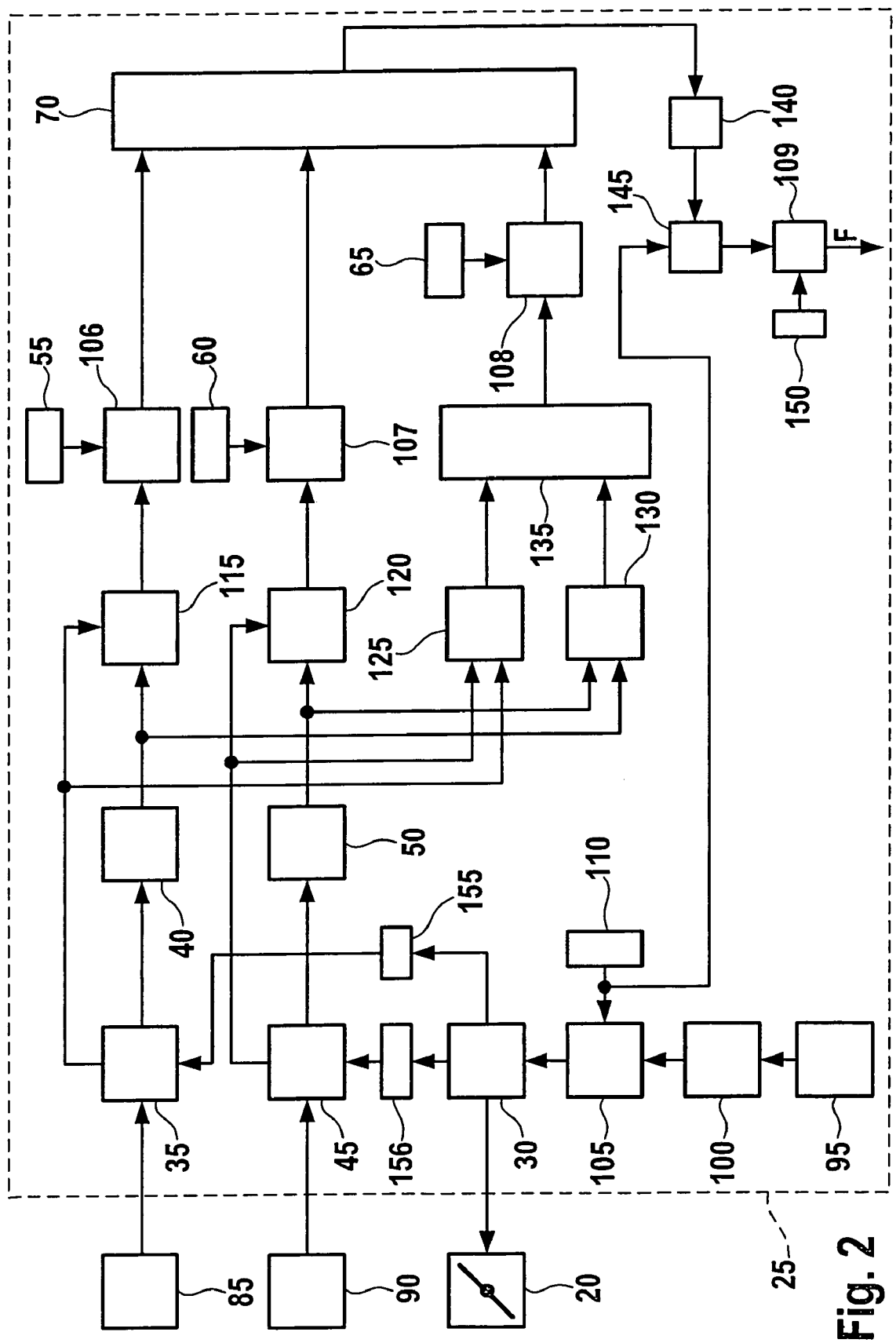
FIG. 2 shows a flow chart for explaining the method according to the present invention and the device according to the present invention.

For the evaluation of the Lambda signals with regard to a diagnosis of the function of actuator 20, a flow chart of device 25 is shown in FIG. 2, device 25 constituting a device for diagnosing crankcase ventilation 1 and actuator 20, in particular. Device 25 includes a first determination unit 35 to which the signal from first Lambda sensor 85 is transmitted. In addition, device 25 includes a second determination unit 40 to which this signal is subsequently forwarded by first determination unit 35. Device 25 includes a third determination unit 45 to which the signal from second Lambda sensor 90 is transmitted. Device 25 includes a fourth determination unit 50 to which this signal is subsequently forwarded by third determination unit 45. Device 25 includes a switchover unit 30, which induces a switchover of actuator 20 between its open and its closed position. Via a first debouncing element 155, switchover unit 30 also induces first determination unit 35 to sample and store a signal value of first Lambda sensor 85. Via a second debouncing element 156, switchover unit 30 induces third determination unit 45 to sample and store a signal value of second Lambda sensor 90. Due to debouncing elements 155, 156, the sampling and storing of the particular signal value occurs at a delay by an applicable debouncing time following the switchover of actuator 20 by switchover unit 30. This applicable debouncing time may be selected to be the same for both debouncing elements 155, 156 and ensures that first Lambda sensor 85 and second Lambda sensor 90 have adjusted to the respective new Lambda value following the switchover of actuator 20, so that the diagnosis of actuator 20 is implementable in a reliable manner on the basis of the sampled Lambda values. It is possible here, for instance, to apply the debouncing time in a suitable manner on an engine test stand or on a dynamic power analyzer in order to enable, for one, the adjustment to a stable Lambda value of individual Lambda sensor 85, 90 and, for another, to allow the lowest possible time offset with respect to the switchover instant of actuator 20 for the most rapid diagnosis possible. Upon each sampling and storing of a new Lambda value by first determination unit 35 and third determination unit 45, the most recently stored Lambda value of first determination unit 35 is transmitted to second determination unit 40 and stored there, and the most recently stored Lambda value of third determination unit 45 is transmitted to fourth determination unit 50 where it is stored. The determination of a Lambda value by first determination unit 35 and third determination unit 45 takes place only once after each switchover operation of actuator 20. As a result, the Lambda values in first determination unit 35 and third determination unit 45 are assigned to a different position of actuator 20 than the Lambda values in second determination unit 40 and fourth determination unit 50. The Lambda values in first determination unit 35 and third determination unit 45 are assigned to one and the same position of actuator 20. The Lambda values of second determination unit 40 and fourth determination unit 50 are also assigned to one and the same position of the actuator. Switchover unit 30 is triggered by a first comparator 105, which compares the signal of a counter 100 to a specified maximum counter reading of a maximum counter reading memory 110. As long as the counter reading of counter 100 has not exceeded the maximum counter reading of maximum counter reading memory 110, first comparator 105 outputs a set pulse to switchover unit 30 with each increase of the counter reading of counter 100, which induces switchover unit 30 to switch actuator 20 over in the manner described, and determination units 35, 40, 45, 50 to detect the Lambda values. When the counter reading of counter 100 exceeds the maximum counter reading, switchover unit 30 is no longer induced by first comparator 105 to switch actuator 20 over and to receive new Lambda values with the aid of determination units 35, 40, 45, 50.

Counter 100 in turn is incremented by a clock-pulse generator 95 using a specified clock-pulse frequency, the clock-pulse period having been selected to be greater than the specified debouncing time.

A first differentiator 115 subtracts the value of second determination unit 40 from the value of first determination unit 35 and forwards the difference to a second comparator 106. A second differentiator 120 subtracts the value of fourth determination unit 50 from the value of third determination unit 45 and forwards the result to a third comparator 107. A third differentiator 125 subtracts the value of third determination unit 45 from the value of first determination unit 135 and forwards the difference to a fifth differentiator 135. A fourth differentiator 130 subtracts the value of fourth determination unit 50 from the value of second determination unit 40 and forwards the difference to a fifth differentiator 135. In a second comparator 106, the amount of the difference formed in first differentiator 115 is compared to a first specified minimum value from a first specification unit 55. If the amount of the difference of first differentiator 115 is below the first specified minimum value, then the second comparator outputs at its output a set signal to an identification unit 70, and otherwise a reset signal. In a third comparator 107, the amount of the difference formed by second differentiator 120 is compared to a second specified minimum value from a second specification unit 60. If the amount of the difference formed by second differentiator 120 undershoots the second specified minimum value, then third comparator 107 outputs a set signal to identification unit 70, and otherwise a reset signal. Fifth differentiator 135 forms the amount of the difference between the difference formed by third differentiator 125 and that of fourth differentiator 130. In a fourth comparator 108, the amount of the difference of fifth differentiator 135 is compared to a third specified minimum value from a third specification unit 65. If the amount of the difference of fifth differentiator 135 undershoots the third specified minimum value of third specification unit 65, then fourth comparator 108 outputs at its output a set signal to identification unit 70, and otherwise a reset signal. Identification unit 70 is designed as OR-gate and has a set signal at its output if at least one of its input signals is set, and otherwise, i.e., when none of its input signals is set, a reset signal. In this specification, the concept of set signal must be understood to mean that a set pulse having a specified duration is involved, which is selected smaller than the clock-pulse period of clock-pulse generator 95, thereby preventing that identification unit 70 is able to output a permanent set signal for a plurality of successive switchover operations of actuator 20. The output signal of identification unit 70 is transmitted to an error counter 140, which is incremented upon each new set pulse at the output of identification unit 70. The counter reading of error counter 140 is transmitted to a ratio former 145, which divides the counter reading of error counter 140 by the maximum counter reading of maximum counter reading memory 110 and transmits the generated quotient to a fifth comparator 109. In addition, fifth comparator 109 receives a specified frequency-threshold value from a frequency-threshold value memory 150. Fifth comparator 109 checks whether the quotient of ratio former 145 reaches or exceeds the frequency-threshold value of frequency-threshold value memory 150 and in this case outputs a set error signal F at its output, and otherwise a reset error signal F. Because of set error signal F, a malfunction of actuator 20 is diagnosed and may be signaled in a further processing, and/or be used to initiate substitute measures, e.g., blocking of the half-engine operation of internal combustion engine 5. Device 25 according to FIG. 2 may, for instance, be implemented in an engine control of internal combustion engine 5 in the form of software and/or hardware.

The first specified minimum value in first specification unit 55, the second specified minimum value in second specification unit 60, and the third specified minimum value in third specification unit 65 can be applied in a suitable manner on an engine test stand or a dynamic power analyzer, for example.

The switchover of actuator 20 controlled by switchover unit 30 from the completely open to the completely closed position results in an enrichment of the exhaust gas in first exhaust tract 75 and an enleanment of the exhaust gas in second exhaust tract 80, as described. Conversely, the switchover of actuator 20 triggered by switchover unit 30 from the completely closed position to the completely open position results in an enleanment of the exhaust gas in first exhaust tract 75 and an enrichment of the exhaust gas in second exhaust tract 80. For an actuator 20 functioning in a fault-free manner, the first specified minimum value is applied on the test stand as the particular quantitative differential value by which the Lambda value of first Lambda sensor 85 minimally changes in the two described switchover operations of the correctly operating actuator 20; of the resulting differences in the Lambda value measured for the two switchover operations on the test stand, it is the one that has the smaller amount which is selected, minus a tolerance threshold for considering interference effects and measuring inaccuracies in the diagnosis implemented according to the exemplary embodiments and/or exemplary methods of the present invention. The second specified minimum value for second exhaust tract 80 is applied on the test stand in an analogous manner.

If actuator 20 is completely open, then the crankcase ventilation essentially takes place symmetrically to both cylinder banks 15, 20, so that the Lambda values in the two exhaust tracts 75, 80 are essentially of equal magnitude. Therefore, the difference between these two Lambda values is ideally equal to zero when actuator 20 is completely open. If actuator 20 is switched over from the completely open to the completely closed position, then the exhaust gas in first exhaust tract 75 becomes richer, as described, and the exhaust gas in second exhaust tract 80 becomes leaner, so that there is a change in the difference between the two Lambda values. If actuator 20 is then switched back again from the completely closed position to the completely open position, the two Lambda values of the two exhaust tracts 75, 80 will approach each other again, so that their difference is equal to zero in the ideal case. This change in the difference between the two Lambda values of the two exhaust tracts 75, 80 in quantitative terms is determined by fifth differentiator 135, while first differentiator 115 determines the resulting difference of the Lambda value of the first exhaust tract 75, and second differentiator 120 determines the resulting difference of the Lambda value of second exhaust tract 80 for a switchover operation of actuator 20. Analogously to the first specified minimum value and the second specified minimum value, using a correctly functioning actuator 20, the third specified minimum value is then applied on a test stand as the particular value that, in quantitative terms, minimally results in the described two switchover operations of actuator 20 for the change in the difference between the Lambda values of the two exhaust tracts 75, 80, minus a tolerance threshold for considering measuring inaccuracies and interference effects.

The maximum counter reading describes the number of switchover operations of actuator 20 to be implemented for a diagnosis operation and may suitably be specified in such a way, for example, that the diagnosis takes up the fewest possible number of switchover operations on the one hand, yet determines a statistically reliable diagnosis result on the other. The maximum counter reading may also be suitably applied on a test stand according to the elucidated meaning. The same applies to the frequency threshold value. The frequency threshold value may, for instance, be suitably applied on a test stand in such a way that, for one, a malfunction of actuator 20 is reliably detected, but measuring inaccuracies and interference effects affecting the diagnosis are sufficiently considered on the other, and as little time as possible is required so as not to interfere with other functions for too long or to prevent them. To determine the suitable frequency threshold value, a plurality of test series may be run on the test stand using, for one, an actuator 20 known to be functioning correctly and, for another, an actuator 20 known to be working in a faulty manner.

It is sufficient for the diagnosis to evaluate only the signal at the output of second comparator 106, or only the signal at the output of third comparator 107, or only the signal at the output of fourth comparator 108 in the manner described, which makes it possible to reduce the expense since only the components required to generate the signals used for the diagnosis need to be provided in device 25. However, the diagnosis becomes more reliable the more of the output signals of second comparator 106, third comparator 107, and fourth comparator 108 are used for the diagnosis in the manner described and linked in identification unit 70 to form an OR operation. As an alternative, an AND operation of the transmitted signals in identification unit 70 may also be implemented and the specification with regard to the detection of an error be increased in this manner.

Figure 3:
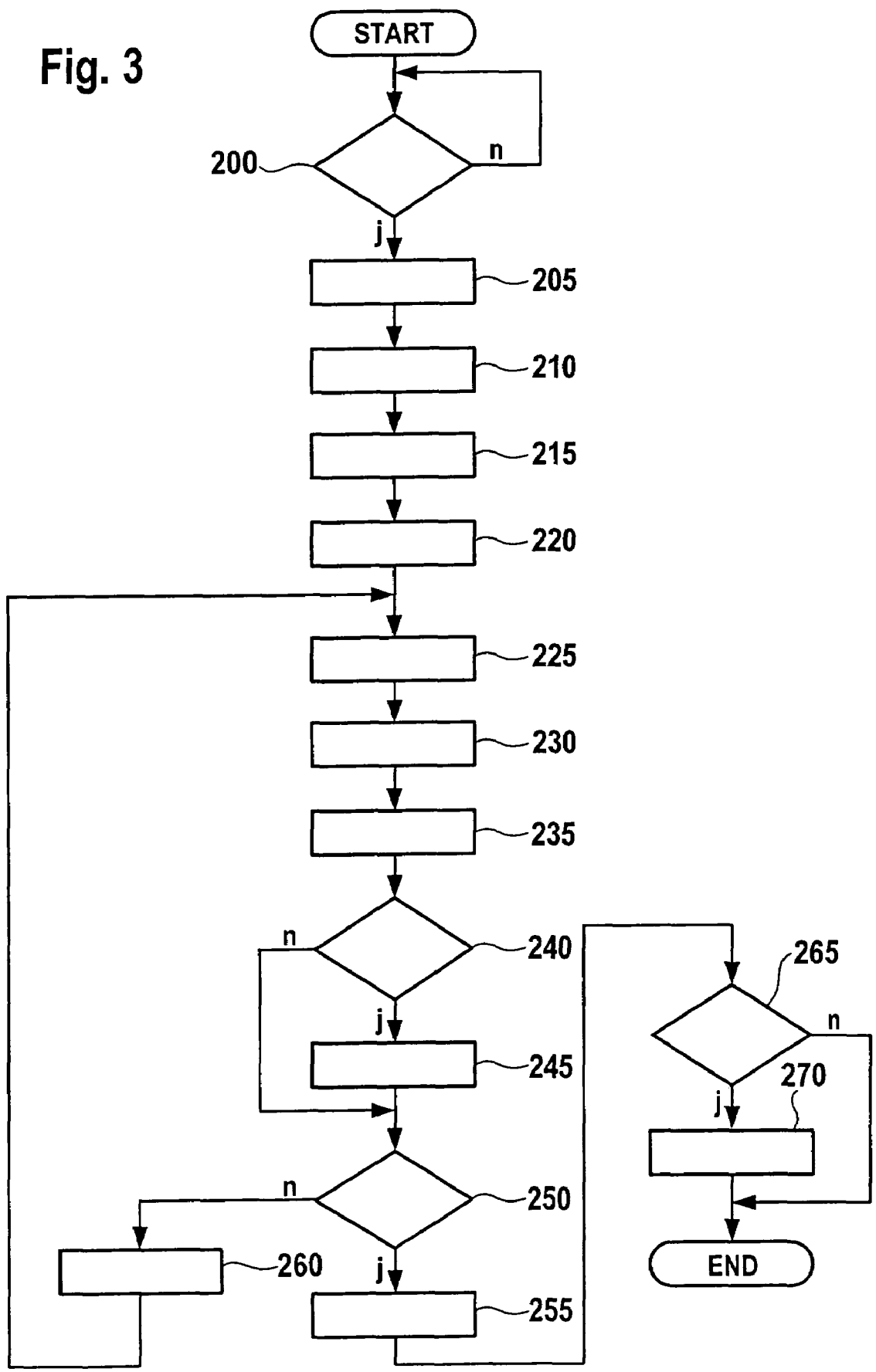
FIG. 3 shows a flow chart for an exemplary sequence of the method according to the present invention.

FIG. 3 shows a flow chart for an exemplary sequence of the method according to the present invention. Especially suitable for implementing the diagnosis is a stable operating point of internal combustion engine 5 having constant engine speed and constant engine loading, as is the case in the idling operating state of internal combustion engine 5, for instance. Furthermore, it is advantageous to deactivate all interference variables, if possible, such as a tank ventilation, and to deactivate different exhaust diagnoses of (which may be prior to) the described diagnosis of actuator 20. In addition, it is advantageous to deactivate a mixture adaptation during the diagnosis according to the exemplary embodiments and/or exemplary methods of the present invention in order not to falsify the adaptation result of the mixture adaptation.

For instance, following the start of the program, it is checked in a program point 200 whether internal combustion engine 5 is in its idling operating state. In addition or as an alternative, further activation conditions may be checked for their satisfaction; for example, if an output stage diagnosis has been concluded without detected error, then full-engine operation exists; if a specified minimum time interval has elapsed since internal combustion engine 5 was started, then the engine temperature lies above a specified threshold, and/ or the like. If this is the case, branching to a program point 205 occurs; otherwise, a return to program point 200 takes place.

In program point 205, an activated tank ventilation and also various exhaust-gas diagnoses of the internal combustion engine are deactivated prior to the diagnosis of actuator 20 to be implemented. Subsequently, branching to a program point 210 takes place.

In program point 210, counter 100 is initialized to the value of zero, as is error counter 140. Branching to a program point 215 then takes place.

In program point 215, actuator 20 is brought into the completely open position during the next clocking of switchover unit 30. Subsequently, branching to a program point 220 takes place.

In program point 220, following the elapsing of the debouncing time since the described triggering of actuator 20 to set the completely open position, first determination unit 35 samples the signal of first Lambda sensor 85 and stores the sampled value. Analogously, following the elapsing of the debouncing time since setting actuator 20 to the completely open position, third determination unit 45 samples the signal of second Lambda sensor 90 and stores the sampled value. Subsequently, branching to a program point 225 takes place.

In program point 225, with the next received clock signal of first comparator 105, the switchover unit initiates the switchover of actuator 20 into the other extreme position that differs from the instantaneous position, in the case at hand, i.e., when reaching program point 225 from program point 220, the triggering of actuator 20 for the switch from the previously triggered, completely open position to the completely closed position. Subsequently, branching takes place to a program point 230.

In program point 230, following the elapsing of the debouncing time since the most recent switchover of actuator 20, first determination unit 35 transmits the most recently stored value to second determination unit 40, the memory of second determination unit 40 being overwritten with the value received from first determination unit 35. Moreover, first determination unit 35 subsequently samples the signal from first Lambda sensor 85 and overwrites its memory with the sampled value. Analogously, following the elapsing of the debouncing time since the most recent switchover of actuator 20, third determination unit 45 transmits the most recently stored value to fourth determination unit 50. Fourth determination unit 50 overwrites its memory with the value received from third determination unit 45. Then, third determination unit 45 samples the signal from second Lambda sensor 90 and overwrites its memory with the sampled value.

Subsequently, branching to a program point 235 takes place. In program point 235, differentiators 115, 120, 125, 130, 135 generate the corresponding differences in the manner described and transmit them to comparators 106, 107, 108, which form an individual output signal in the manner described and transmit it to identification unit 70. Subsequently, branching occurs to a program point 240.

In program point 240, it is checked in identification unit 70 whether at least one output signal or, as an alternative, also several of the output signals, of second comparator 106, third comparator 107, and fourth comparator 108 is/are set and thus at least one of the detected changes in the switchover of actuator 20 lies below the associated specified minimum value. If this is the case, branching to a program point 245 takes place; otherwise, branching to a program point 250 occurs.

In program point 245, identification unit 70 emits a set pulse, and error counter 140 is incremented by one. The program subsequently branches to program point 250.

In program point 250, it is checked in first comparator 105 whether the counter reading of counter 100 has exceeded the specified maximum counter reading. If this is the case, branching to a program point 255 takes place; otherwise, branching to a program point 260 occurs.

In program point 260, counter 100 is incremented by one at the next clock signal of clock-pulse generator 95. Branching back to program point 225 then occurs.

In program point 255, the error-counter reading is divided by the maximum counter reading in ratio former 145. Subsequently, branching to a program point 265 takes place.

In program point 265, fifth comparator 109 checks whether the quotient formed by ratio former 145 reaches or exceeds the specified frequency-threshold value. If this is the case, branching to a program point 270 occurs, and otherwise error signal F is reset or an unset error signal F is output and the program left.

In program point 270, error signal F is set, thereby diagnosing a malfunction of actuator 20; due to set error signal F, the malfunction of actuator 20 is represented optically and/or acoustically, for example, and an operation under emergency conditions of internal combustion engine 5 is set optionally. Then, the program is left.

The method according to the present invention and the device according to the present invention were described above by way of example for an internal combustion engine having two cylinder banks. The diagnosis of crankcase ventilation 1 according to the exemplary embodiments and/or exemplary methods of the present invention, especially of actuator 20 of crankcase ventilation 1, may correspondingly also be implemented for internal combustion engines having more than two cylinder banks each having a separate exhaust tract and a separate fresh-air supply, of which one is able to be separated from crankcase ventilation 1 in the manner described with the aid of actuator 20 by complete closing of actuator 20. In this case, as well, the described Lambda change in the individual exhaust-gas tracts of the affected cylinder banks can be monitored, although to a lesser extent as the number of cylinder banks that cannot be blocked from crankcase ventilation 1 via actuator 20 increases. For each cylinder bank having a separate exhaust tract, a comparator similar to second comparator 106 and third comparator 107 together with appropriately assigned components may be provided in device 25, whose output signal is likewise transmitted to identification unit 70. The same applies to the comparison between the Lambda values of two different exhaust tracts in each case with regard to fourth comparator 108; in this comparison, any Lambda value of a cylinder bank not blockable with respect to crankcase ventilation 1 may be compared to the Lambda value of second exhaust tract 80 with respect to the cylinder bank that is blockable with regard to crankcase ventilation 1. Here, too, with an increasing number of cylinder banks that cannot be blocked with regard to crankcase ventilation 1, the extent of the detectable change in the difference of the Lambda value in a switchover of actuator 20 becomes smaller.

To implement the diagnosis, it is sufficient to monitor a single switchover operation of actuator 20 from its completely open to its completely closed position, or from its completely closed position to its completely open position. However, the reliability of the diagnosis becomes increasingly greater the more switchover operations are monitored in the described manner. Thus, the maximum counter reading may assume any integral values that are greater than or equal to zero, the diagnosis process taking longer as the maximum counter reading rises. To enable the implementation of a reliable statistical evaluation or diagnosis of the function of actuator 20, however, the maximum counter reading should be selected greater than zero. However, if the maximum counter reading is selected equal to zero, then the frequency threshold may assume the value one.

In the afore-described exemplary embodiment, the oxygen content in the exhaust gas or the Lambda value was selected as characteristic variable for the exhaust-gas composition. Nevertheless, it is also possible to select any other characteristic variable for the exhaust-gas composition or exhaust quantity which, in the event of a switchover of actuator 20 from its completely closed position to its completely open position, or from its completely open to its completely closed position, indicates a change in the exhaust-gas composition which is evaluable in its extent if it is detectable by a suitable sensor system. A fuel content in the exhaust gas, for instance, also may be selected as characteristic variable if it is detectable by a suitable sensor system.

In the above text, a switchover of actuator 20 from its completely closed into its completely open position, or from its completely open to its completely closed position was described. However, a change in the distribution of crankcase ventilation 1 to the two cylinder banks 10, 15 also already results even if no change takes place in the position of actuator 20. The greatest change in the distribution of crankcase ventilation 1, and thus also the greatest change in the Lambda values within the particular exhaust tract, or the greatest change in the difference between the Lambda values of the two exhaust tracts, results if actuator 20 is switched from its completely closed position to its completely open position or from its completely open position to its completely closed position. Maximum reliability of the diagnosis is therefore achieved for this case. However, the diagnosis is implementable in the described manner, with lower reliability as a result of smaller changes in the distribution of crankcase ventilation 1, also if the switchover of actuator 20 takes place from a first specified position to a second specified position that differs therefrom; the difference between the two specified positions should advantageously be selected such that it leads to evaluable changes at the output of differentiators 115, 120 and 135.

In the exemplary embodiment described above, actuator 20 is situated in such a way that it is able to block crankcase ventilation 1 to second cylinder bank 15 completely, but not the crankcase ventilation to first cylinder bank 10. However, depending on the position of actuator 20, the distribution of crankcase ventilation 1 to the two cylinder banks 10, 15 may be influenced to different degrees also when actuator 20 is disposed in shared supply 300 of crankcase ventilation 1, for instance. In this case the crankcase ventilation is interrupted completely in the completely closed position of actuator 20, that is to say, both to first cylinder bank 10 and to second cylinder bank 15. While it is true in this case that no different development of the Lambda value in the two exhaust tracts 75, 80 is detectable for different positions of actuator 20 and the evaluation with the aid of fourth comparator 108 is therefore no longer usable, different Lambda values will come about in the individual exhaust tracts 75, 80 with a different setting of actuator 20 without control intervention of the Lambda control, which may differ from the completely closed position of actuator 20 in each case, so that the described evaluation is implementable for the diagnosis of actuator 20 in the described manner with the aid of second comparator 106 and third comparator 107. If actuator 20 is situated in shared tract 300 of crankcase ventilation 1, the different distribution of crankcase ventilation 1, unlike previously, is not to be understood in the sense that the portion of the crankcase ventilation supplied to first cylinder bank 10 differs from the portion of the crankcase ventilation supplied to second cylinder bank 15, but to the effect that, depending on the position of actuator 20, a different measure of the crankcase ventilation reaches the two cylinder banks 10, 15; nevertheless, given symmetrical crankcase ventilation 1 and independently of the position of actuator 20, both cylinder banks 10, 15 are supplied with the same quantity of crankcase ventilation. In the completely closed position of actuator 20, the crankcase ventilation to both cylinder banks 10, 15 is completely interrupted in this case.

However, as soon as actuator 20 is situated in crankcase ventilation 1 in such a way that different shares of the crankcase ventilation that reach first cylinder bank 10 or second cylinder bank 15 result for the different positions of actuator 20, it is also possible to utilize the output signal of fourth comparator 108 for diagnosing the function of actuator 20 in the manner described, in addition to the evaluation of the output signals of second comparator 106 and third comparator 107 in the manner described. This diagnosis would even be possible solely on the basis of the output signal of fourth comparator 108, provided the change at the output of fifth differentiator 135 resulting from the switching of the position of actuator 20 between two specified position is of sufficient magnitude to allow a reliable evaluation in fourth comparator 108 in the manner described. To this end, actuator 20 may be disposed in crankcase ventilation 1 in such a way, for example, that, depending on the position, it is able to simultaneously reduce the crankcase ventilation to first cylinder bank 10 and the crankcase ventilation to second cylinder bank 15, but to different degrees. This is conceivable, for instance, if actuator 20 is situated in region 305 of crankcase ventilation 1, in which shared tract 300 branches to the two cylinder banks 10, 15. If, given such a placement of actuator 20, a different blocking effect of the crankcase ventilation to the two cylinder banks 10, 15 thereupon results at different positions of actuator 20, then, as described, not only the output signals of comparators 106, 107 but also the output signal of fourth comparator 108 may be utilized for the diagnosis in the manner described. In that case, the diagnosis in the described manner would then even be possible solely with the aid of the output signal of fourth comparator 108.

Crankcase ventilation 1 also influences characteristic variables of internal combustion engine 5 other than the exhaust-gas composition, such as, for example, the intake manifold pressure of the individual cylinder banks, the gas composition in the individual intake manifold of the particular cylinder banks, the combustion-chamber pressure and the combustion-chamber pressure characteristic in the individual cylinder banks. These variables may be evaluated for diagnosing the function of actuator 20 in a manner that mirrors the method described for the exhaust-gas composition.

What is claimed is:

1. A device for diagnosing a crankcase ventilation of an internal combustion engine, having at least two cylinder banks to which the crankcase ventilation is supplied, comprising:
    an actuator, whose position influences a distribution of the crankcase ventilation to the at least two cylinder banks, and in which in a first position of the actuator, a different distribution of the crankcase ventilation to the at least two cylinder banks comes about than in a second position of the actuator which differs therefrom;
    a switchover arrangement, together with simultaneously activated operation of the at least two cylinder banks, to switch the actuator over at least once between the two different positions;
    a determination arrangement to determine a characteristic variable of the internal combustion engine influenced by the crankcase ventilation for at least one of the at least two cylinder banks prior to and following the switchover operation;
    a specification arrangement to determine a minimum value for a change in at least one of (i) the characteristic variable of at least one of the at least two cylinder banks, and (ii) a ratio of the characteristic variable between the at least two cylinder banks for the switchover-related change in the distribution of the crankcase ventilation; and
    an identification arrangement to detect a malfunction of the actuator if at least one change derived from the ascertained values for the characteristic variable undershoots in quantitative terms its assigned expected value.

2. A method for diagnosing a crankcase ventilation of an internal combustion engine, having at least two cylinder banks to which the crankcase ventilation is supplied, the method comprising:
    influencing, via a position of an actuator, a distribution of the crankcase ventilation to the at least two cylinder banks, wherein in a first position of the actuator a different distribution of the crankcase ventilation to the at least two cylinder banks occurs than in a second position of the actuator that differs therefrom, and wherein, with simultaneously activated operation of the at least two cylinder banks, the actuator is switched in a switchover operation at least once between the two different positions;
    determining a characteristic variable of the internal combustion engine influenced by the crankcase ventilation for at least one of the at least two cylinder banks prior to and following the switchover operation;
    specifying a minimum value for a change in at least one of (i) the characteristic variable of at least one of the at least two cylinder banks, and (ii) a ratio of characteristic variables between the at least two cylinder banks, for the switchover-related change in a distribution of the crankcase ventilation to the at least two cylinder banks; and
    detecting a malfunction of the actuator if at least one change derived from ascertained values for the characteristic variable undershoots in quantitative terms its assigned expected minimum value.

3. The method of claim 2, wherein an oxygen content in the exhaust gas is selected as the characteristic variable.

4. The method of claim 2, wherein the diagnosis is implemented in an operating state of the internal combustion engine having constant engine speed and engine loading.

5. The method of claim 2, wherein a tank ventilation and an exhaust diagnosis are deactivated during implementation of the diagnosis of the crankcase ventilation.

6. The method of claim 2, wherein the evaluation of the characteristic variable is blocked for a specified debouncing time following a switchover of the position of the actuator.

7. The method of claim 2, wherein the malfunction of the actuator is diagnosed only if, after implementing a number of switchover operations of the actuator that is greater than or equal to a minimum number greater than one, the malfunction is detected more frequently than a specified threshold value.

8. The method of claim 2, wherein the diagnosis is implemented in an idling state of the internal combustion engine having constant engine speed and engine loading.

* * * * *